No. 779,783. PATENTED JAN. 10, 1905.
M. B. IRVINE.
CENTERING DEVICE FOR CHEESE CUTTERS.
APPLICATION FILED APR. 22, 1904.
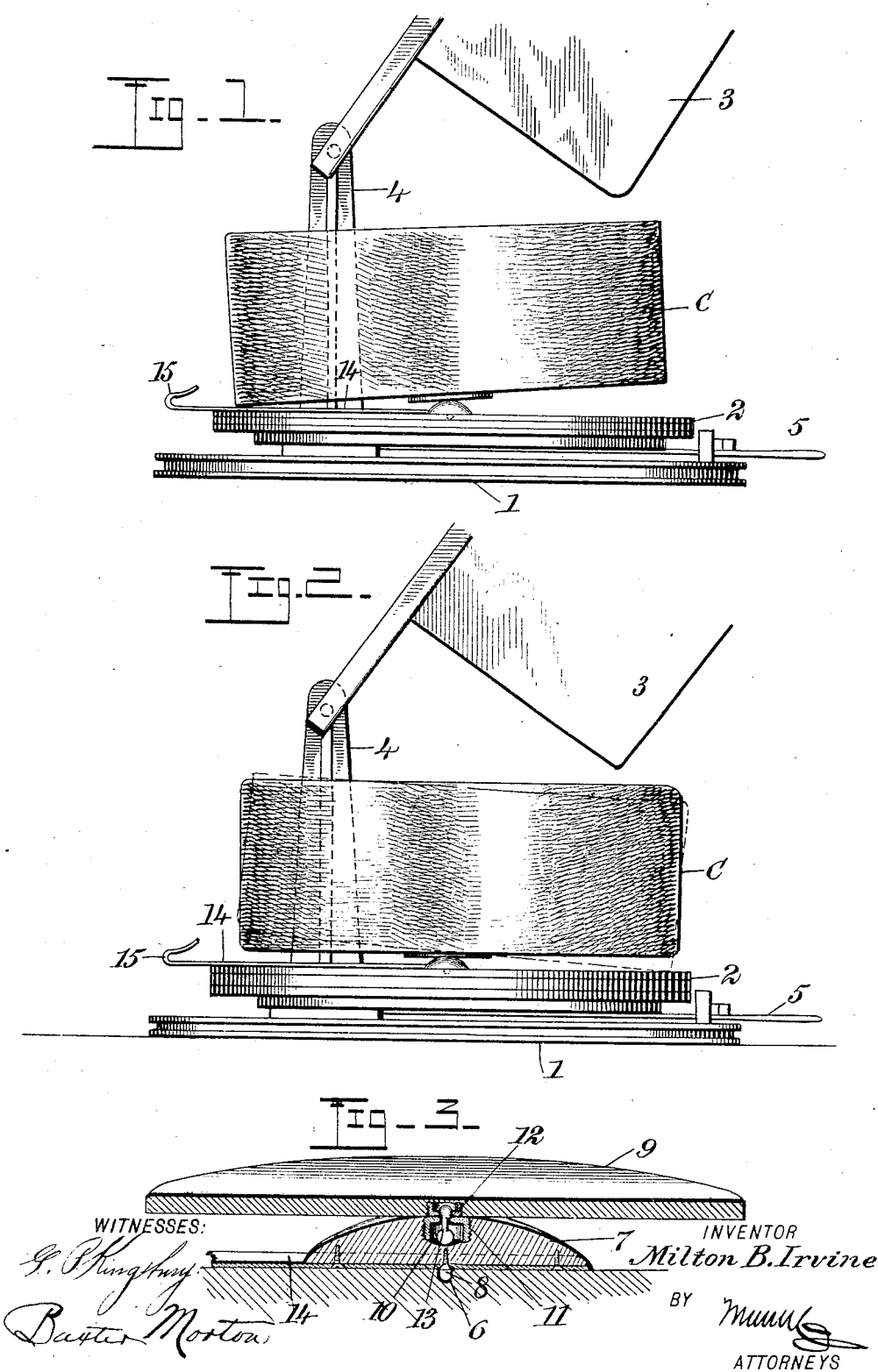

No. 779,783.

Patented January 10, 1905.

UNITED STATES PATENT OFFICE.

MILTON BOYD IRVINE, OF LONGBEACH, CALIFORNIA.

CENTERING DEVICE FOR CHEESE-CUTTERS.

SPECIFICATION forming part of Letters Patent No. 779,783, dated January 10, 1905.

Application filed April 22, 1904. Serial No. 204,385.

*To all whom it may concern:*

Be it known that I, MILTON BOYD IRVINE, a citizen of the United States, and a resident of Longbeach, in the county of Los Angeles and State of California, have invented a new and Improved Centering Device for Cheese-Cutters, of which the following is a full, clear, and exact description.

This invention relates to a centering device for cheese-cutters of the type in which the cheese is mounted upon a revolving table and is cut by means of a knife supported upon a framework above the table.

In cheese-cutters of the type specified the object is always to cut slices the weight of which is accurately determined by the cut, thus doing away with the necessity of weighing the slices after they are cut from the cheese. If cheeses are supported upon the revolving tables of such cutters so that the geometrical center of the cheese is directly above the center of the table about which it revolves, the slices cut from the cheese will not necessarily correspond in weight to the cut, for the reason that it is very common for cheese to vary considerably in density.

The object of the present invention is to provide a simple, durable, and easily-manipulated device by means of which cheeses may be so centered relatively to the revolving tables of cheese-cutters that the center of gravity of the cheese will always be directly above the center about which the table turns, and hence insure proper weight in the slices cut from the cheese.

The object above mentioned is attained in the device hereinafter described and claimed.

Reference is to be had to the accompanying drawings, forming a part of this specification, in which similar characters of reference indicate corresponding parts in all the views.

Figure 1 is an elevational view of a cheese-cutter having the centering device which forms the present invention in position thereon and showing a cheese in position upon the centering device. Fig. 2 is a view similar to Fig. 1, showing the cheese centered by means of the centering device; and Fig. 3 is a sectional perspective view of the centering device, the extremity of the handle being broken away to save space.

Referring to the drawings, 1 designates the base of the cheese-cutter, 2 the revolving table of the cheese-cutter, and 3 the knife of the cheese-cutter, which is supported by suitable standards, one of which is shown at 4.

Any suitable mechanism may be provided to turn the table 2 of the cheese-cutter upon its base, and in the drawings illustrative of this invention a lever 5 is provided for that purpose.

In the table 2 of the cheese-cutter immediately above the pivot-point about which the table turns there is provided a small recess 6, which serves to indicate the center of the table.

The centering device proper consists of a base member 7, which is preferably formed with a rounded upper surface and is provided on its under surface with a stud 8, which is adapted to engage the recess 6, formed in the upper surface of the table 2 of the cheese-cutter. The stud 8 is located at the center of the under surface of the base member 7, and immediately above it a supporting member 9 is so poised that it may be tilted freely in any direction. The supporting member 9 is preferably circular in contour, and the center thereof is secured directly above the center of the base 7, so that when no weight is imposed upon the supporting member 9 it will rest in horizontal position, as indicated in Fig. 3; but when any weight is placed upon the member 9 at one side of the center the member 9 will be tilted at once out of its normal position. In order to provide for the tilting movement of the supporting member 9 and also to hold it in proper position relatively to the base member 7, I provide in the top of the base member a cavity 10, into which I fit a bearing member 11, which is preferably threaded so that it will be firmly held in position. In the under surface of the supporting member 9 a similar bearing member 12 of somewhat smaller size than the member 11 is secured in reverse position, and a connection 13, consisting of a dumb-bell-shaped member, is arranged between the two bearings 11 and 12, the ends of the connection 13 being extended through small openings in the two bearings. As shown in Fig. 3, the connection 13 between the bearings 11 and 12 will permit free tilting movement of the supporting member 9, but will always restore the center of the member 9 to its proper position directly above the center of the base 7 when any superincumbent weight is removed from the supporting member.

To facilitate the handling of the centering device, an arm 14, which is preferably formed of thin metal, is attached to the under surface of the base 7 by screws or other suitable fastening means, and its free end is bent to form a hook 15.

The method of using the centering device will be readily understood from inspection of the drawings. The stud 8, which is provided on the under surface of the base of the centering device, is first brought into engagement with the recess 6, provided therefor in the table of the cheese-cutter. Then the cheese (which is ordinarily of cylindrical form, as indicated at C in Figs. 1 and 2) is placed upon the supporting member 9 of the centering device. If the center of gravity of the cheese is not directly above the center of the supporting member 9, the cheese will tilt to one side, as shown in Fig. 1, and the position of the center of gravity of the cheese will be indicated by the direction in which it tilts. The cheese will then be adjusted upon the supporting member 9 until it rests in horizontal position, as shown in solid lines in Fig. 2. The horizontal position of the cheese may be very accurately determined, because the entire centering device rises but little above the upper surface of the table of the cheese-cutter, and a very slight departure of the cheese from the true horizontal position can be easily observed by noting the position of the different parts of the lower edge of the cheese relatively to the table of the cutter. When the cheese has been brought into true horizontal position and the center of gravity has therefore been located exactly above the center of the supporting member 9, the cheese will be tilted, as indicated in dotted lines in Fig. 2, until it rests at one side upon the table 2 of the cheese-cutter. The opposite side of the cheese will then be raised sufficiently to lift the cheese out of contact with the supporting member 9 of the centering device, so that the centering device may be removed from the table of the cheese-cutter, the arm 14 serving as a handle for the manipulation of the centering device. After the centering device has been removed the cheese is lowered so that it rests upon the table of the cheese-cutter, and the center of gravity of the cheese will then be in proper position immediately above the center of the table. Consequently every sector of the cheese will have a weight proportional to the size of the angle between its sides.

From the foregoing description of the construction and use of the improved centering device it will be seen that it affords a very simple and effective means for centering a cheese upon the turn-table of a cheese-cutter in such a way that the sectors of cheese cut off by the knife will be of proper weight regardless of any variations in the density of the cheese. It will also be observed that the centering device is of extremely simple and inexpensive construction, that it will not become worn and unreliable in use, and that it may be used with satisfactory results in connection with any cheese-cutter having a turn-table upon which the cheese is carried by simply providing in the center of the upper surface of the turn-table a recess into which the stud in the center of the base of the centering device will fit.

While I have described the preferred form of embodiment of my invention, it is obvious that various changes in the minor details of construction—such, for example, as the precise form of connection employed between the base and the supporting member poised thereon—may be made without departing from the spirit of the invention or materially sacrificing the advantages thereof. I do not wish, therefore, to be limited to the precise structures shown and described, but reserve the right to make changes therein within the scope of the appended claims.

Having thus described my invention, I claim as new and desire to secure by Letters Patent—

1. A device of the character specified, comprising a base provided with a handle member for manipulating the device, and a supporting member poised upon the base and susceptible of lateral tilting movement.

2. A device of the character specified, comprising a base having a rounded upper surface, and a supporting member having a flat lower surface poised directly upon the rounded surface of the base and susceptible of lateral tilting movement.

3. A device of the character specified, comprising a base having a rounded upper surface provided with a bearing, a supporting member poised upon the base, and having a bearing in the under surface thereof resting on the bearing of the base, and a connection between the bearings of the base and the supporting member by which the center of the supporting member is normally maintained directly above the center of the base.

4. The combination with a cheese-cutter having a turn-table provided at the center with a recess, of a cheese-centering device having a stud adapted for engagement with the recess in the turn-table.

5. A device of the character specified, comprising a base having a bearing in the upper surface thereof, a supporting member poised upon the base and having a bearing in the under surface thereof, and a connection between said bearings which permits lateral tilting movement of the supporting member, but insures the return of the supporting member to its normal position with the center thereof above the center of the base.

6. A device of the character specified comprising a base having a cavity in its upper face, a bearing fitted in said cavity and flush with the surface of the base, a supporting member having a bearing fitted in a cavity in its under surface and poised upon the bearing of the base, and a dumb-bell-shaped connection provided between the said bearings.

7. The combination with a cheese-cutter having a turn-table, of a cheese-centering device comprising a base supported on the turn-table, and a supporting member for the cheese poised upon the base and having lateral tilting movement.

8. The combination with a cheese-cutter having a turn-table provided at the center with a recess, of a cheese-centering device comprising a base having a stud on its under face adapted for engagement with the recess in the turn-table, and a supporting member poised upon the base and susceptible of lateral tilting movement.

9. The combination with a cheese-cutter having a turn-table provided at the center with a recess, of a cheese-centering device comprising a base having a stud on its under surface adapted for engagement with the recess in the turn-table, and a bearing in its upper surface, a supporting member having a corresponding bearing poised upon the said base, and a dumb-bell-shaped connection provided between said bearings.

10. A device of the character specified comprising a base member having a rounded upper surface, a handle secured to the bottom of the base member, and a circular supporting member poised at its center upon the rounded upper surface of the base member and susceptible of lateral tilting movement thereon.

In testimony whereof I have signed my name to this specification in the presence of two subscribing witnesses.

MILTON BOYD IRVINE.

Witnesses:
 Frank P. Smith,
 T. B. Kinney.